Patented Oct. 26, 1954

2,692,895

UNITED STATES PATENT OFFICE 2,692,895

PRODUCTION OF PANTOTHENALDEHYDE AND ACETALS THEREOF

Adolf Christian Josef Opfermann, Bergisch-Gladbach, Germany

No Drawing. Application August 9, 1951, Serial No. 241,163

Claims priority, application Austria August 23, 1950

3 Claims. (Cl. 260—561)

This invention relates to the production of pantothenaldehyde and acetals thereof. It is known that pantothenaldehyde like pantothenic acid has hair growth promoting properties.

It has now been found that pantothenaldehyde or acetals thereof can be produced in a simple manner by reacting alpha-hydroxy-beta,beta-dimethyl-gamma-hydroxy-butyryl amide with acrolein and acetals thereof.

The reaction is preferably carried out in a suitable solvent, for example absolute alcohol or methanol. The reaction is promoted by heat and stirring. After the reaction is complete, the relevant alcohol is removed by distillation in a stream of carbon dioxide.

The hydroxy amide used as the starting material can be prepared in various ways. Alpha-hydroxy-beta-beta-dimethyl-butyrolactone can be reacted by the process of Reichstein and Grüssner in a suitable solvent, for example in methanol, with dry ammonia gas. Alternatively the reaction can be carried out with solid alpha-hydroxy-beta-beta-dimethyl-butyrolactone. The reaction is preferably carried out in the cold, preferably with cooling with ice. It is important to use ammonia which is as dry as possible.

The following examples show how the process of the invention may be carried into effect.

EXAMPLES

Example 1

130 grams of alpha-hydroxy-beta-beta-dimethyl-gamma-butyrolactone were reacted with dry ammonia whilst being cooled with ice. 73.5 grams of the hydroxy amide obtained were dissolved in 250 cc. of absolute alcohol, whereupon this solution was treated with continuous stirring with 28 grams of acrolein dissolved in 25 cc. of absolute alcohol. The mixture thereupon immediately heated up to approximately 35–40° C. This temperature was maintained with stirring. After 3 hours the alcohol was distilled off in vacuo, whereby pantothenaldehyde was obtained as a thick yellow syrup. The titratable aldehyde content of the product obtained was 65%. Pure pantothenaldehyde was obtained by distillation under a pressure of 1.0 mm. Hg at a temperature of 135–140° C. The yield of pantothenaldehyde was 80% of the theoretical.

Analysis:
 Calculated 53.2% C, found 53.0% C.
 Calculated 8.38% H, found 8.40% H.

The reaction takes place according to the following equations:

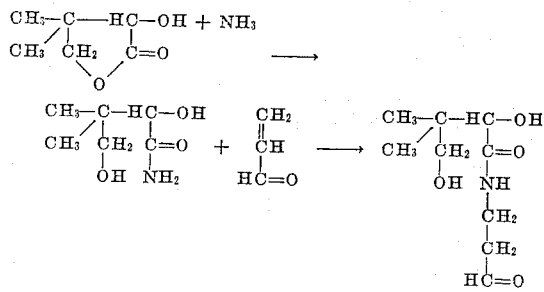

*Example 2*

When acrolein was replaced by its dimethyl or diethyl acetal, the corresponding pantothenacetals were obtained.

73.5 gms. of hydroxyamide were dissolved in 250 cc. of absolute ethanol and 51 gms. of acroleindimethylacetal dissolved in 50 cc. of absolute ethanol were added. Thereupon the reaction mixture heated up to 45° C. This temperature was maintained with continuous stirring. The alcohol was removed in vacuo after completion of the reaction.

Pure pantothenaldimethylacetal was obtained by distillation in vacuo at 155–160° C. under a pressure of 10 mm. Hg.

The yield of pantothenaldimethylacetal was 60% of the theoretical.

Analysis:
 Calculated 53.0% C, found 53.0% C.
 Calculated 9.25% H, found 9.20% H.

What I claim is:

1. A process for the production of a compound selected from the group consisting of pantothenaldehyde and its acetals which consists in forming a reaction solution consisting of equimolecular quantities of alpha-hydroxy-beta-beta - dimethyl - gamma - hydroxy - butyryl amide and a compound selected from the group consisting of acrolein and acrolein acetals dissolved in an alkanol containing not more than two carbon atoms and permitting such amide and acrolein compound to react at an elevated temperature up to 45° C.

2. A process for the production of pantothenaldehyde which consists in forming a reaction solution consisting of equimolecular quantities of alpha - hydroxy - beta - beta - dimethyl - gamma-hydroxy-butyryl amide and acrolein dissolved in an alkanol containing not more than two carbon atoms and permitting such amide and acrolein to react at an elevated temperature up to 40° C.

3. A process for the production of an acetal of pantothenaldehyde which consist in forming a reaction solution consisting of equimolecular quantities of alpha-hydroxy-beta-beta-dimethyl-gamma-hydroxy-butyryl amide and acrolein acetal dissolved in an alkanol containing not more than two carbon atoms and permitting such amide and acrolein acetal to react at an elevated temperature up to 45° C.

References Cited in the file of this patent
UNITED STATES PATENTS

| Number | Name | Date |
|---|---|---|
| 2,358,337 | Lawson et al. | Sept. 19, 1944 |
| 2,372,654 | Bergel et al. | Apr. 3, 1945 |
| 2,475,846 | Lundberg | July 12, 1949 |